(12) United States Patent
Sasabe

(10) Patent No.: US 10,873,897 B2
(45) Date of Patent: Dec. 22, 2020

(54) BASE STATION DEVICE, BASE STATION MANAGEMENT DEVICE, COMMUNICATION CONTROL METHOD, AND COMMUNICATION CONTROL SYSTEM

(71) Applicant: NEC Corporation, Tokyo (JP)

(72) Inventor: Seiya Sasabe, Tokyo (JP)

(73) Assignee: NEC CORPORATION, Tokyo (JP)

( * ) Notice: Subject to any disclaimer, the term of this patent is extended or adjusted under 35 U.S.C. 154(b) by 124 days.

(21) Appl. No.: 16/327,395

(22) PCT Filed: Aug. 23, 2017

(86) PCT No.: PCT/JP2017/030016
§ 371 (c)(1),
(2) Date: Feb. 22, 2019

(87) PCT Pub. No.: WO2018/043220
PCT Pub. Date: Mar. 8, 2018

(65) Prior Publication Data
US 2019/0200279 A1 Jun. 27, 2019

(30) Foreign Application Priority Data
Aug. 29, 2016 (JP) .................. 2016-166376

(51) Int. Cl.
*H04W 48/02* (2009.01)
*H04W 88/08* (2009.01)
(52) U.S. Cl.
CPC ............ *H04W 48/02* (2013.01); *H04W 88/08* (2013.01)
(58) Field of Classification Search
CPC . H04W 48/02; H04W 88/08; H04W 36/0005; H04W 36/08; H04W 36/34
See application file for complete search history.

(56) References Cited

U.S. PATENT DOCUMENTS

2016/0330654 A1* 11/2016 Jung ..................... H04W 48/18
2017/0214567 A1* 7/2017 Salkintzis ......... H04W 72/0413
2018/0160416 A1* 6/2018 Mitsui ............... H04W 72/0406

FOREIGN PATENT DOCUMENTS

| JP | 2006332844 A | 12/2006 |
| WO | 2006087797 A1 | 8/2006 |
| WO | 2013027836 A1 | 2/2013 |

OTHER PUBLICATIONS

Nishimura, Y., et al., "A Method of MAC Protocol for Throughput Enhancement in Ad Hoc Networks", IEICE Technical Report, 2008, vol. 107, No. 441, pp. 85-90 (7 pages).

(Continued)

*Primary Examiner* — Paul H Masur

(57) ABSTRACT

This base station device is provided with: receiving means for receiving first information indicating that a radio communication apparatus has been assigned to another base station device present in a radio wave coverage area where communication with the base station device is possible; and control means for switching, based on the first information, a setting of the base station device to a restricted mode, wherein the restricted mode is a setting according to which the base station device receives, from at least one of the another base station device and a radio communication apparatus having issued a connection request, second information indicating that a response to the connection request issued by the radio communication apparatus has been issued by the another base station device, and performs, based on the second information, an operation for lowering a priority level for assignment to the base station device.

13 Claims, 12 Drawing Sheets

(56) References Cited

OTHER PUBLICATIONS

International Search Report, dated Nov. 14, 2017 from the International Bureau in counterpart International application No. PCT/JP2017/030016.

* cited by examiner

BASE STATION DEVICE, BASE STATION MANAGEMENT DEVICE, COMMUNICATION CONTROL METHOD, AND COMMUNICATION CONTROL SYSTEM

This application is a National Stage Entry of PCT/JP2017/030016 filed on Aug. 23, 2017, which claims priority from Japanese Patent Application 2016-166376 filed on Aug. 29, 2016, the contents of all of which are incorporated herein by reference, in their entirety.

TECHNICAL FIELD

The present invention relates to a base station device, a base station management device, a communication control method, and a communication control system.

BACKGROUND ART

In a wireless communication network such as a wireless local area network (wireless LAN), there is a problem of a decrease in utilization efficiency of a communication resource due to inhibition of wireless communication of a radio communication apparatus, a base station device, and the like present in a radio wave coverage area where mutual communication is possible.

As one example of a method of enhancing utilization efficiency of a communication resource, NPL 1 describes a method based on improvement in a media access control protocol (MAC protocol).

CITATION LIST

Non Patent Literature

[NPL 1] Yasutaka NISHIMURA, Shoichiro ASANO, "A Method of MAC Protocol for Throughput Enhancement in Ad Hoc Networks", IEICE technical report, Jan. 18, 2008, vol. 107, No. 441, pp. 85-90

SUMMARY OF INVENTION

Technical Problem

The above-described method in NPL 1 still has a problem that utilization efficiency of a communication resource cannot be enhanced in some cases.

In light of the above-described problem, an object in various aspects of the present invention is to provide a base station device, a base station management device, a communication control method, and a communication control system that enhance utilization efficiency of a communication resource.

Solution to Problem

A base station device, according to a first aspect of the present invention, includes: receiving means for receiving first information indicating that a radio communication apparatus has been assigned to another base station device present in a radio wave coverage area where communication with the base station device is possible; and control means for switching, based on the first information, a setting of the base station device to a restricted mode, wherein the restricted mode is a setting according to which the base station device receives, from at least one of the another base station device and a radio communication apparatus having issued a connection request, second information indicating that a response to the connection request issued by the radio communication apparatus has been issued by the another base station device, and performs, based on the second information, an operation for lowering a priority level for assignment to the base station device.

A first communication control method, according to a second aspect of the present invention, includes: receiving information indicating that a radio communication apparatus has been assigned to another base station device present in a radio wave coverage area where communication with a base station device is possible; and switching, based on the information, a setting of the base station device to a restricted mode, wherein the restricted mode is a setting according to which the base station device receives, from at least one of the another base station device and a radio communication apparatus having issued a connection request, second information indicating that a response to the connection request issued by the radio communication apparatus has been issued by the another base station device, and performs, based on the second information, an operation for lowering a priority level for assignment of the radio communication apparatus to the base station device.

A base station management device, according to a third aspect of the present invention, includes: receiving means for receiving, from a base station device, information indicating that a radio communication apparatus has been assigned to the base station device; and transmitting means for transmitting, to another base station device present in a radio wave coverage area where communication with the base station device is possible, information for switching a setting of the another base station device to a restricted mode, based on the information, wherein the restricted mode is a setting according to which the base station device receives, from at least one of the another base station device and a radio communication apparatus having issued a connection request, second information indicating that a response to the connection request issued by the radio communication apparatus has been issued by the another base station device, and performs, based on the second information, an operation for lowering a priority level for assignment of the radio communication apparatus to the base station device.

A second communication control method, according to a fourth aspect of the present invention, includes: receiving, from a base station device, information indicating that a radio communication apparatus has been assigned to the base station device; and transmitting, to another base station device present in a radio wave coverage area where communication with the base station device is possible, information for switching a setting of the another base station device to a restricted mode, based on the information, wherein the restricted mode is a setting according to which the base station device receives, from at least one of the another base station device and a radio communication apparatus having issued a connection request, second information indicating that a response to the connection request issued by the radio communication apparatus has been issued by the another base station device, and performs, based on the second information, an operation for lowering a priority level for assignment of the radio communication apparatus to the base station device.

A communication control system, according to a fifth aspect of the present invention, includes: a base station device; a base station management device; and a communication control device including an access network discovery and selection function (ANDSF) of generating a connection policy for controlling connection of a radio communication apparatus to the base station device, wherein the base station management device includes: first receiving means for receiving, from the base station device, first information indicating that a radio communication apparatus has been assigned to the base station device; first transmitting means for transmitting, to another base station device present in a radio wave coverage area where communication with the base station device is possible, information for switching a setting of the another base station device to a restricted mode, based on the first information; second receiving means for receiving, from the base station device, fifth information indicating whether or not a setting of the base station device is a restricted mode; and second transmitting means for transmitting the fifth information to the communication control device, the communication control device includes policy generation means for generating the connection policy, based on the fifth information, and the restricted mode is a setting according to which the base station device receives, from at least one of the another base station device and a radio communication apparatus having issued a connection request, second information indicating that a response to the connection request issued by the radio communication apparatus has been issued by the another base station device, and performs, based on the second information, an operation for lowering a priority level for assignment of the radio communication apparatus to the base station device.

Advantageous Effects of Invention

According to various aspects of the present invention, a base station device, a base station management device, a communication control method, and a communication control system that enhance utilization efficiency of a communication resource are provided.

EXAMPLE EMBODIMENT

A configuration of each device according to the present invention is illustrated by a block on a function basis. Each function is implemented by any combinations of hardware and software, and there are various modification examples of a method and a device for implementing each function. The following example embodiments are merely for illustrative purposes, and various configurations and combinations other than the following may be employed.

First Example Embodiment

Figure 1:
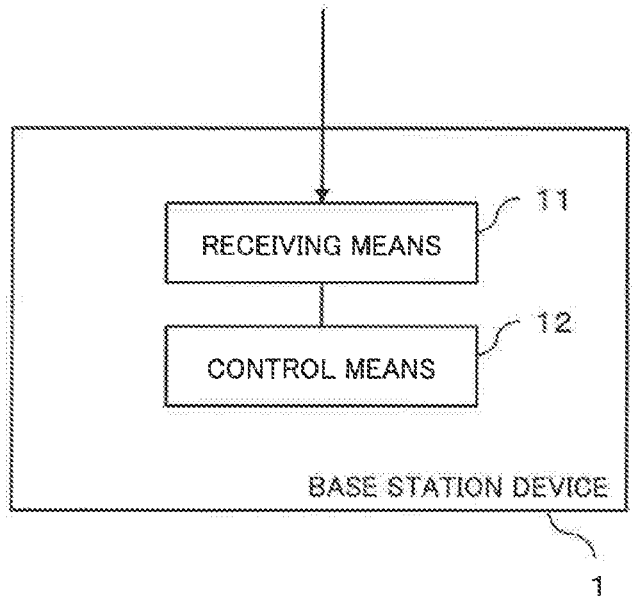
FIG. 1 is a block diagram illustrating a configuration of a base station device according to a first example embodiment of the present invention.

FIG. 1 is a block diagram illustrating a configuration of a base station device according to a first example embodiment of the present invention. A base station device 1 illustrated in FIG. 1 includes a receiving means 11 and a control means 12. The receiving means 11 is a means for receiving first information indicating that a radio communication apparatus has been assigned to another base station device present in a radio wave coverage area where communication with the base station device 1 is possible. The control means 12 is a means for switching, based on the first information, a setting of the base station device 1 to a restricted mode.

The base station device 1 is a device having a data relay function and a data transfer function. Specifically, the base station device 1 is, but is not limited to, a wireless LAN router and the like. A radio communication apparatus may be, but is not limited to, either user equipment (UE) having a function of wireless connection to a Third Generation Partnership Project (3GPP) network and a wireless LAN, or a station (STA) having a function of wireless connection to a wireless LAN. Specifically, examples of either UE or a STA include, but are not limited to, a cellular phone, a tablet terminal, a sensor, a personal computer (PC), and the like.

The restricted mode is a setting whereby the base station device 1 receives, from at least either one of another base station device and a radio communication apparatus having issued a connection request, second information indicating that a response to the connection request issued by the radio communication apparatus has been issued by the another base station device present in a radio wave coverage area where communication with the base station device 1 is possible, and performs, based on the second information, an operation for lowering a priority level of the radio communication apparatus for assignment to the base station device 1. Examples of the second information include, but are not limited to, for example, the response itself, an acknowledgement (ACK) for the response, and the like. The operation of lowering a priority level for assignment to its own base station device may be, for example, an operation of discarding a connection request, an operation of delaying a response to a connection request, an operation of rejecting a connection request, an operation of recommending assignment to a base station device other than its own base station device, an operation of interrupting processing for assignment to its own base station device, or an operation of causing to interrupt processing for assignment to its own base station device. Examples of the operation of delaying a response to a connection request include, but are not limited to, for example, delaying a response to a connection request by a period of not less than Max Channel Time of a radio communication apparatus, and the like. Examples of the operation of rejecting a connection request include, but are not limited to, for example, transmission of a message for rejection, transmission of a response that includes information (for example, a cause of rejection, and the like) indicating rejection, and the like. Examples of the operation of recommending assignment to a base station device other than its own base station device include, but are not limited to, for example, transmission of information (for example, an address, an SSID, and the like of a base station device other than its own base station device) for recommending assignment to a base station device other than its own base station device, and the like. Examples of the connection request include, but are not limited to, for example, a probe request, an authentication request, an association request, and the like. Examples of the response to a connection request include, but are not limited to, for example, a probe response, an authentication response, an association response, and the like.

When the base station device 1 operates according to a method of passive scanning, the base station device 1 may be set in such a way as not to operate according to the method of passive scanning when a setting of the base station device 1 enters the restricted mode. This enables to reduce an opportunity for a radio communication apparatus to be assigned to the base station device 1 switched to the restricted mode.

Figure 2:
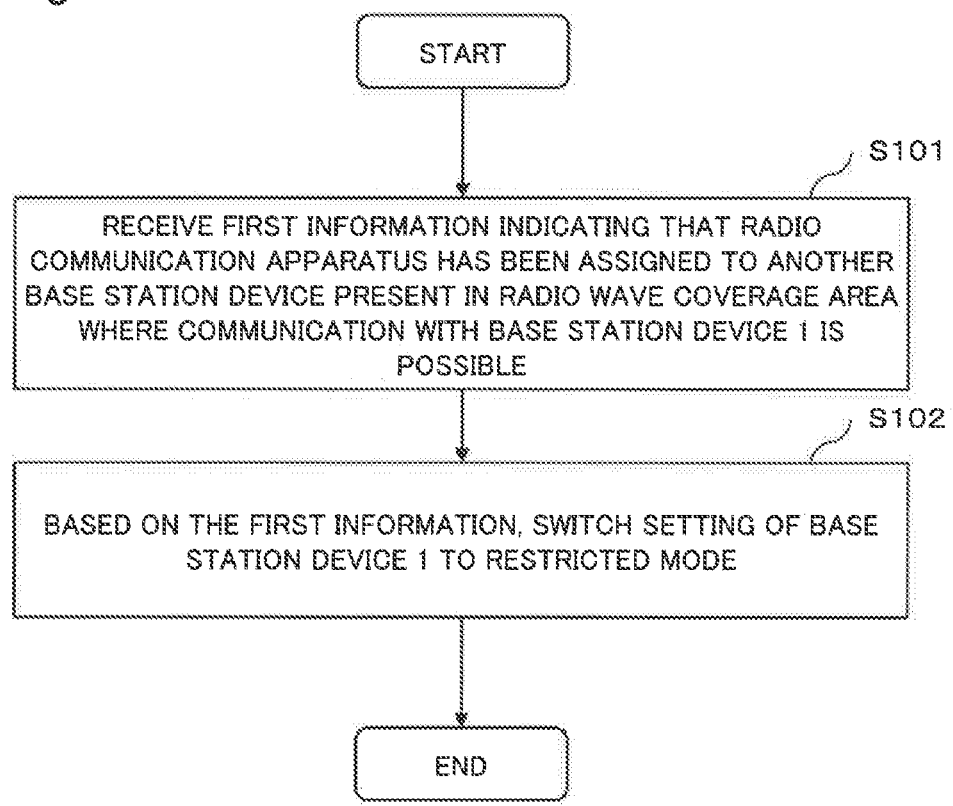
FIG. 2 is a flowchart illustrating an operation of communication control of the base station device according to the first example embodiment of the present invention.

FIG. 2 is a flowchart illustrating an operation of communication control of the base station device according to the first example embodiment of the present invention. According to FIG. 2, in Step S101, the base station device 1 receives first information indicating that a radio communication apparatus has been assigned to another base station device present in a radio wave coverage area where communication is possible. In Step S102, the base station device 1 switches a setting to the restricted mode, based on the first information received in Step S101.

This operation of communication control is implemented by, for example, the base station device 1. Specifically, Step S101 is implemented by, for example, the receiving means 11, and Step S102 is implemented by, for example, the control means 12.

Figure 3:
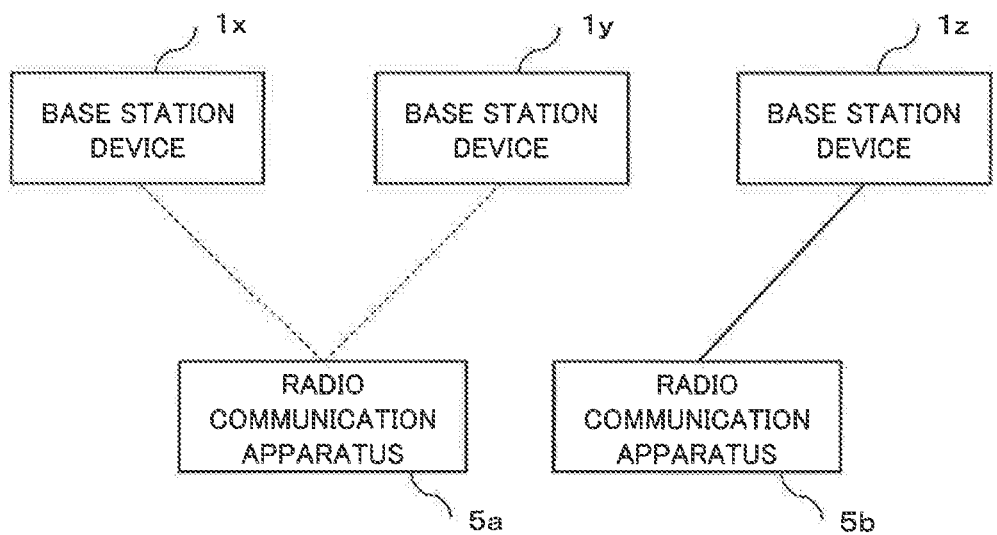
FIG. 3 is a schematic diagram illustrating an example of an operation of communication control of the base station device according to the first example embodiment of the present invention.

In a related art, when a radio communication apparatus is in an area where it is possible to be assigned to a plurality of base station devices, the radio communication apparatus is assigned to any of the base station devices, based on received signal strength (RSS). In contrast to such a related art, in the first example embodiment of the present invention, a radio communication apparatus performs control of selecting a particular base station device independently of RSS, owing to the above-described characteristic. A radio communication apparatus newly attempting to communicate with any of base station devices is not assigned to one base station device with a setting switched to the restricted mode, but is rather assigned preferentially to another base station device present in a radio wave coverage area where communication is possible and with a setting other than the restricted mode. This enables to "concentrate" wireless connections of a plurality of radio communication apparatuses on a base station device with a setting other than the restricted mode, in the first example embodiment of the present invention. For example, in FIG. 3, it is assumed that a base station device 1*x* and a base station device 1*y* are in a radio wave coverage area where mutual communication is possible, that the base station device 1*y* and a base station device 1*z* are in a radio wave coverage area where mutual communication is possible, and that the base station device 1*x*, the base station device 1*y*, and a radio communication apparatus 5*a* are in a radio wave coverage area where mutual communication is possible. It is assumed that the base station device 1*x* and the base station device 1*z* are not in a radio wave coverage area where mutual communication is possible, and that the base station device 1*z* and the radio communication apparatus 5*a* are not in a radio wave coverage area where mutual communication is possible. When communication between a radio communication apparatus 5*b* and the base station device 1*z* is taking place, assigning the radio communication apparatus 5*a* to the radio communication apparatus 1*y* for starting communication causes mutual interference in the each communication, resulting in throughput degradation (so called an exposed node problem and a deafness problem). In such a case, in the first example embodiment of the present invention, a setting of the base station device 1*y* is switched to the restricted mode, based on that the radio communication apparatus 5*b* has been assigned to the base station device 1*z*. Such a function allows the radio communication apparatus 5*a* to be preferentially assigned to the base station device 1*x* rather than to the base station device 1*y*, which prevents mutual interference in communications of the radio communication apparatus 5*a* and the radio communication apparatus 5*b*. Thus, the first example embodiment of the present invention enables to provide a base station device and a communication control method that reduce influence of the exposed node problem and the deafness problem and enhance utilization efficiency of a communication resource, without modification of a radio communication apparatus such as a radio communication terminal.

In a modification example 1 of the first example embodiment of the present invention, the above-described first information is information to be transmitted from another base station device, based on that the first radio communication apparatus has been assigned to the another base station device present in a radio wave coverage area where communication with the base station device 1 is possible.

In the modification example 1 of the first example embodiment of the present invention, the first information is transmitted from another base station device, based on that the first radio communication apparatus has been assigned to the another base station device present in a radio wave coverage area where communication with the base station device 1 is possible, owing to the above-described characteristic. Consequently, the modification example 1 of the first example embodiment of the present invention enables to provide a base station device and a communication control method that prevent unnecessary transmission of the first information.

In a modification example 2 of the first example embodiment of the present invention, the above-described first information is information to be transmitted from another base station device when a setting of the another base station device present in a radio wave coverage area where communication with the base station device 1 is possible is not the restricted mode.

In the modification example 2 of the first example embodiment of the present invention, the first information is transmitted from another base station device when a setting of the another base station device present in a radio wave coverage area where communication with the base station device 1 is possible is not the restricted mode, owing to the above-described characteristic. Consequently, the modification example 2 of the first example embodiment of the present invention enables to provide a base station device and a communication control method that prevent unnecessary switching to the restricted mode.

Figure 4:
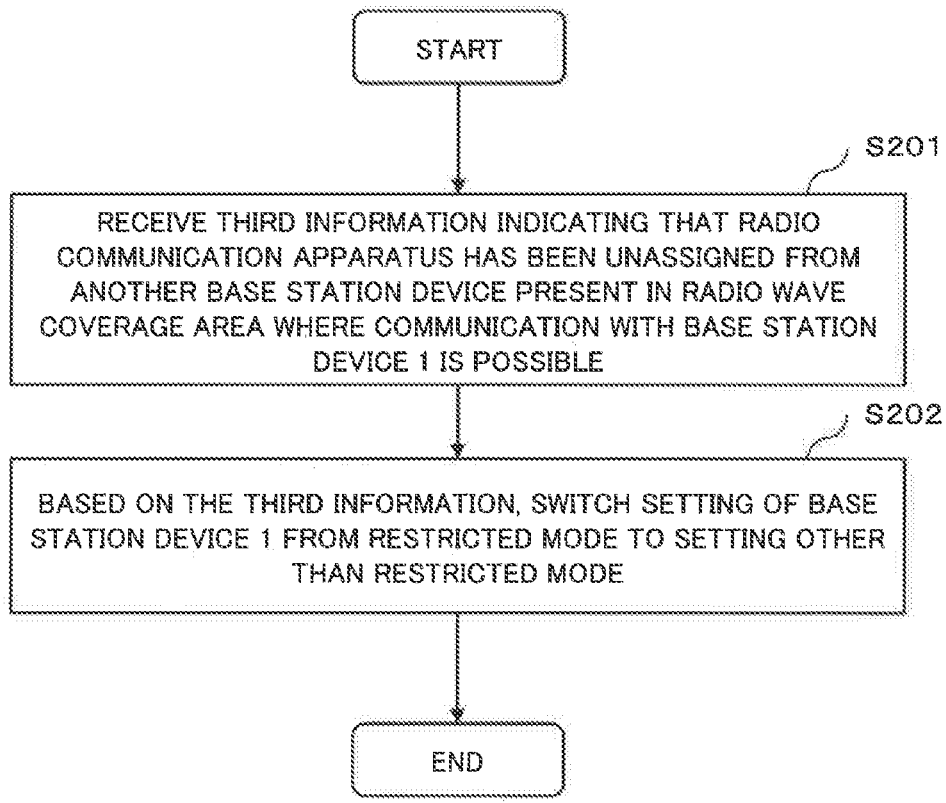
FIG. 4 is a flowchart illustrating an operation of communication control of a base station device according to a modification example 3 of the first example embodiment of the present invention.

FIG. 4 is a flowchart illustrating an operation of communication control of a base station device according to a modification example 3 of the first example embodiment of the present invention. According to FIG. 4, in Step S201, the base station device 1 receives third information indicating that a radio communication apparatus has been unassigned from another base station device present in a radio wave coverage area where communication is possible. In Step S202, the base station device 1 switches, based on the third information received in Step S201, its own setting from the restricted mode to a setting other than the restricted mode.

This operation of communication control is implemented by, for example, the base station device 1. Specifically, Step S201 is implemented by, for example, the receiving means 11, and Step S202 is implemented by, for example, the control means 12.

In the modification example 3 of the first example embodiment of the present invention, the base station device 1 is able to not only switch to the restricted mode but also switch from the restricted mode to a setting other than the restricted mode, owing to the above-described characteristic. Consequently, the modification example 3 of the first example embodiment of the present invention enables to provide a base station device and a communication control method that improve throughput degradation due to switching to the restricted mode.

Figure 5:
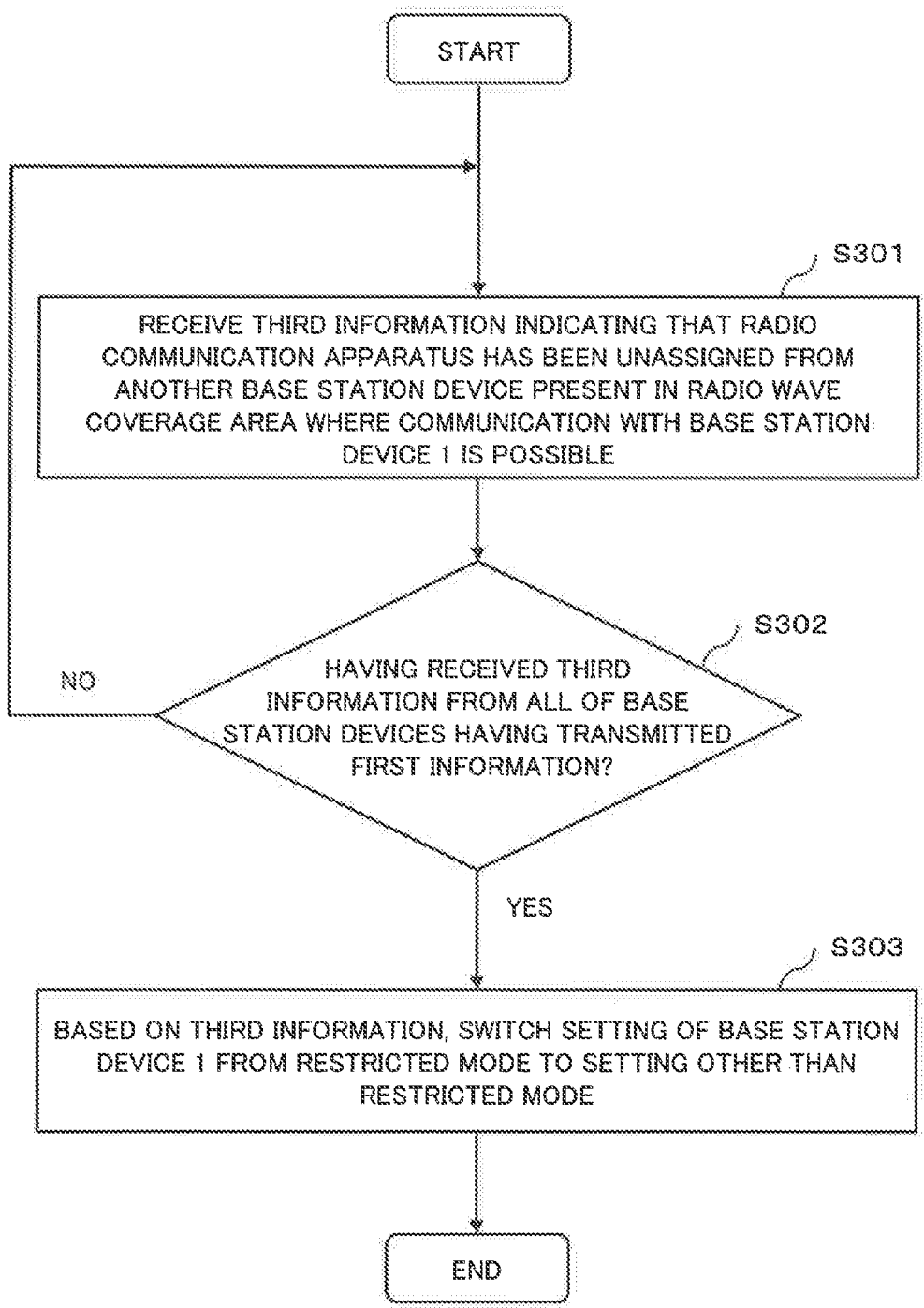
FIG. 5 is a flowchart illustrating an operation of communication control of a base station device according to a modification example 4 of the first example embodiment of the present invention.

FIG. 5 is a flowchart illustrating an operation of communication control of a base station device according to a modification example 4 of the first example embodiment of the present invention. According to FIG. 5, in Step S301, the base station device 1 receives third information indicating that a radio communication apparatus has been unassigned from another base station device present in a radio wave coverage area where communication is possible. In Step S302, when it is determined that the base station device 1 has not received the third information from all of base station devices having transmitted the first information, the control flow returns to Step S301. In Step S302, when it is determined that the base station device 1 has received the third information from all of base station devices having transmitted the first information, the control flow proceeds to Step S303. In Step S303, the base station device 1 switches, based on the third information, its own setting from the restricted mode to a setting other than the restricted mode.

This operation of communication control is implemented by, for example, the base station device 1. Specifically, Step S301 is implemented by, for example, the receiving means 11, Step S302 is implemented by, for example, at least either one of the receiving means 11 and the control means 12, and Step S302 is implemented by, for example, the control means 12.

In the modification example 4 of the first example embodiment of the present invention, only when the base station device 1 has received the third information from all of base station devices having transmitted the first information, the base station device 1 switches, based on the third information, its own setting from the restricted mode to a setting other than the restricted mode, owing to the above-described characteristic. Consequently, the modification example 4 of the first example embodiment of the present invention enables to switch a setting of the base station device 1 from the restricted mode to a setting other than the restricted mode, when one or more base station devices to which radio communication apparatuses are concentratedly assigned are still in a radio wave coverage area where communication with the base station device 1 is possible. Thus, it becomes possible to provide a base station device and a communication control method that alleviate concentration of radio communication apparatuses on the base station device to which the radio communication apparatuses are concentratedly assigned.

In the modification example 4 of the first example embodiment of the present invention, the above-described third information is information to be transmitted from another base station device when a setting of the another base station device present in a radio wave coverage area where communication with the base station device 1 is possible is not the restricted mode.

In the modification example 4 of the first example embodiment of the present invention, the third information is transmitted from another base station device when a setting of the another base station device present in a radio wave coverage area where communication with the base station device 1 is possible is not the restricted mode, owing to the above-described characteristic. Consequently, the modification example 4 of the first example embodiment of the present invention enables to provide a base station device and a communication control method that prevent unnecessary switching from the restricted mode to a setting other than the restricted mode.

Figure 6:
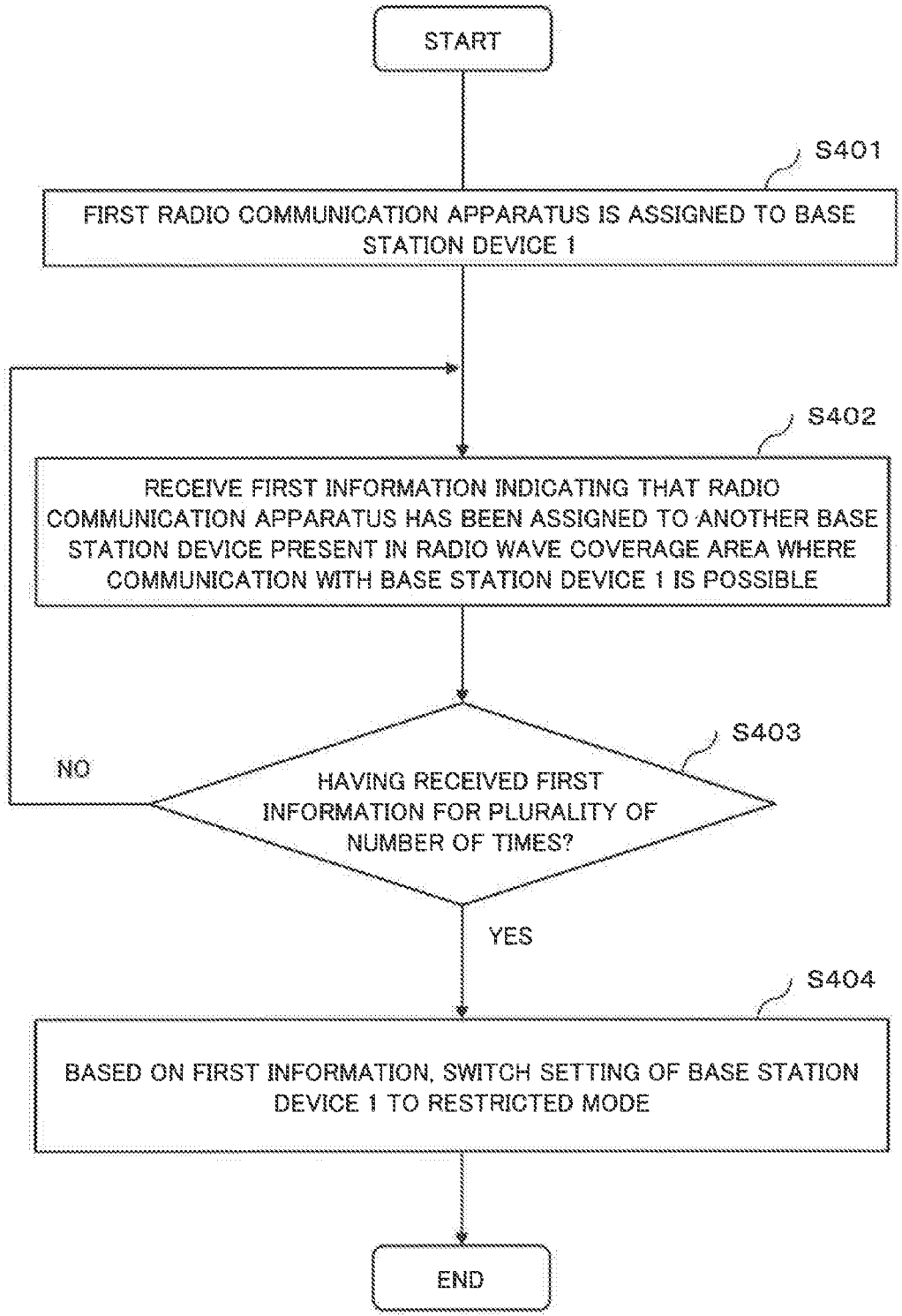
FIG. 6 is a flowchart illustrating an operation of communication control of a base station device according to a modification example 5 of the first example embodiment of the present invention.

FIG. 6 is a flowchart illustrating an operation of communication control of a base station device according to a modification example 5 of the first example embodiment of the present invention. According to FIG. 6, in Step S401, the first radio communication apparatus is assigned to the base station device 1. In Step S402, the base station device 1 receives first information indicating that a radio communication apparatus has been assigned to another base station device present in a radio wave coverage area where communication with the base station device 1 is possible. In Step S403, when it is determined that the base station device 1 has not received the first information for a plurality of number of times, the control flow returns to Step S402. In Step S403, when it is determined that the base station device 1 has received the first information for a plurality of number of times, the control flow proceeds to Step S404. In Step S404, the base station device 1 switches its own setting to the restricted mode, based on the first information.

This operation of communication control is implemented by, for example, the base station device 1. Specifically, Step S401 is implemented by, for example, an input/output interface 43 of a base station device illustrated in FIG. 16, Step S402 is implemented by, for example, the receiving means 11, Step S403 is implemented by, for example, at least either one of the receiving means 11 and the control means 12, and Step S404 is implemented by, for example, the control means 12.

In the modification example 5 of the first example embodiment of the present invention, when the base station device 1 first receives the first information after the first radio communication apparatus has been assigned to the base station device 1, the base station device 1 does not switch its own setting to the restricted mode, owing to the above-described characteristic. Consequently, the modification example 5 of the first example embodiment of the present invention enables to provide a base station device and a communication control method that prevent unnecessary switching of a base station device to the restricted mode, when radio communication apparatuses have been concurrently assigned to both of the base station device and another base station device present in a radio wave coverage area where communication with the base station device is possible.

In the modification example 5 of the first example embodiment of the present invention, the above-described first information is information to be transmitted from another base station device, based on that the another base station device has been changed from the restricted mode to a setting other than the restricted mode, when a radio communication apparatus is assigned to the another base station device present in a radio wave coverage area where communication with the base station device 1 is possible and which is set to the restricted mode.

In the modification example 5 of the first example embodiment of the present invention, the first information is transmitted based on that another base station device has been changed from the restricted mode to a setting other than the restricted mode, when a radio communication apparatus is assigned to the another base station device, the another base station device being present in a radio wave coverage area where communication with the base station device 1 is possible and being set to the restricted mode, owing to the above-described characteristic. Consequently, the modification example 5 of the first example embodiment of the present invention enables to provide a base station device and a communication control method that are able to appropriately switch a setting of a base station device to the restricted mode, in order to concentrate radio communication apparatuses on another base station device present in a radio wave coverage area where communication with the base station device is possible.

Figure 7:
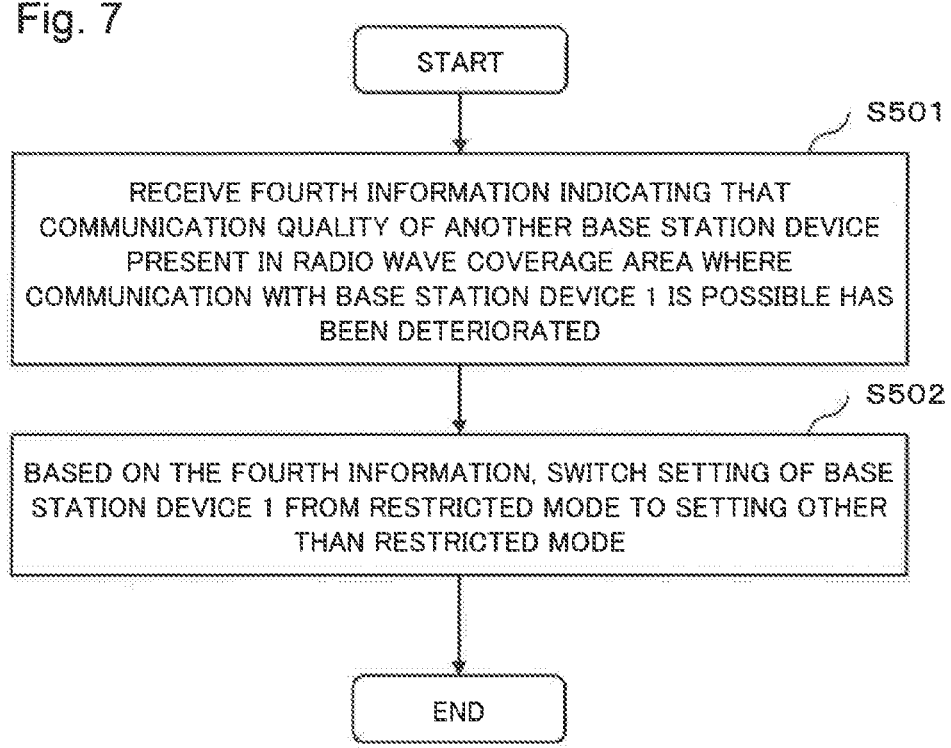
FIG. 7 is a flowchart illustrating an operation of communication control of a base station device according to a modification example 6 of the first example embodiment of the present invention.

FIG. 7 is a flowchart illustrating an operation of communication control of a base station device according to a modification example 6 of the first example embodiment of the present invention. According to FIG. 7, in Step S501, the base station device 1 receives fourth information indicating that communication quality of another base station device present in a radio wave coverage area where communication is possible has been deteriorated. In Step S502, the base station device 1 switches, based on the fourth information received in Step S501, its own setting from the restricted mode to a setting other than the restricted mode. Examples of the communication quality of a base station device include, but are not limited to, for example, information specified based on throughput, delay time, jitter, a packet loss rate, a CPU use rate, a BSS load element (BLE), the number of assigned radio communication apparatuses, or the like.

This operation of communication control is implemented by, for example, the base station device 1. Specifically, Step S501 is implemented by, for example, the receiving means 11, and Step S502 is implemented by, for example, the control means 12.

In the modification example 6 of the first example embodiment of the present invention, the base station device 1 receives fourth information indicating that communication quality of another base station device present in a radio wave coverage area where communication is possible has been deteriorated, owing to the above-described characteristic. Then, the base station device 1 switches, based on the fourth information, its own setting from the restricted mode to a setting other than the restricted mode. Consequently, the modification example 6 of the first example embodiment of the present invention enables to provide a base station device and a communication control method that reduce an opportunity to be assigned to another base station device with deteriorated communication quality.

In the modification example 6 of the first example embodiment of the present invention, the above-described fourth information is information to be transmitted from another base station device when a setting of the another base station device present in a radio wave coverage area where communication with the base station device 1 is possible is not the restricted mode.

In the modification example 6 of the first example embodiment of the present invention, the fourth information is transmitted from another base station device when a setting of the another base station device present in a radio wave coverage area where communication with the base station device 1 is possible is not the restricted mode, owing to the above-described characteristic. Consequently, the modification example 6 of the first example embodiment of the present invention enables to provide a base station device and a communication control method that prevent unnecessary switching from the restricted mode to a setting other than the restricted mode.

Figure 8:
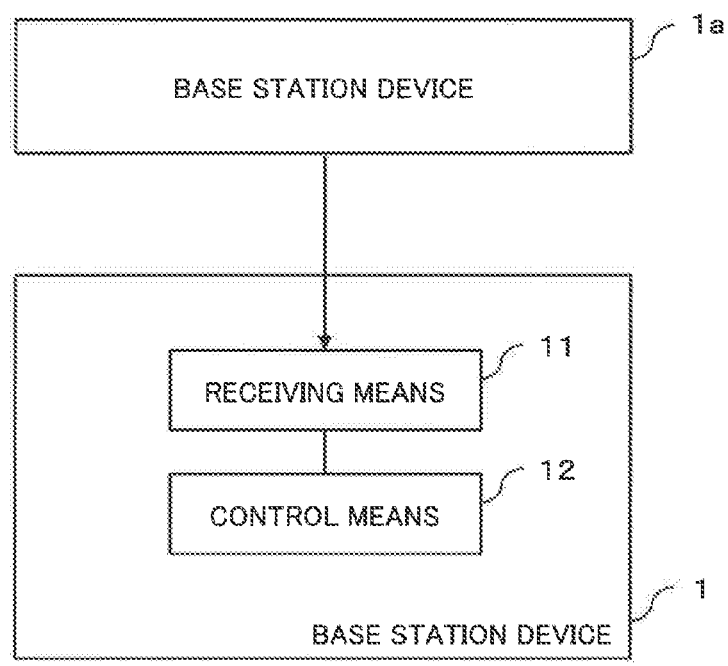
FIG. 8 is a block diagram illustrating a method of receiving first information, third information, and fourth information by a base station device according to a modification example 7 of the first example embodiment of the present invention.

FIG. 8 is a block diagram illustrating a method of receiving the above-described first information, the above-described third information, and the above-described fourth information by a base station device according to a modification example 7 of the first example embodiment of the present invention. The first information, the third information, and the fourth information may be received by the base station device 1 from another base station device 1*a* present in a radio wave coverage area where communication is possible, by using a method such as Beacon.

In the modification example 7 of the first example embodiment of the present invention, the base station device 1 receives the first information, the third information, and the fourth information from the another base station device 1*a* present in a radio wave coverage area where communication is possible, owing to the above-described characteristic. Consequently, the modification example 7 of the first example embodiment of the present invention enables to provide a base station device and a communication control method that enable operation of an autonomous distributed network.

Figure 9:
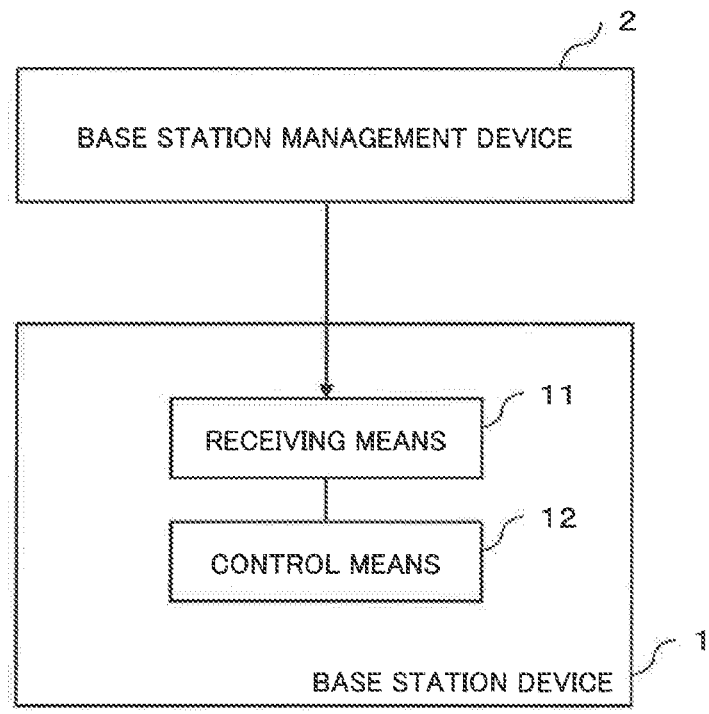
FIG. 9 is a block diagram illustrating a method of receiving first information, third information, and fourth information by a base station device according to a modification example 8 of the first example embodiment of the present invention.

FIG. 9 is a block diagram illustrating a method of receiving the above-described first information, the above-described third information, and the above-described fourth information by a base station device according to a modification example 8 of the first example embodiment of the present invention. The base station device 1 may receive the first information, the third information, and the fourth information from a base station management device 2.

In the modification example 8 of the first example embodiment of the present invention, the base station device 1 receives the first information, the third information, and the fourth information from the base station management device 2, owing to the above-described characteristic. Consequently, the modification example 8 of the first example embodiment of the present invention enables to provide a base station device and a communication control method that facilitate network design and management such as switching of the restricted mode.

Second Example Embodiment

Figure 10:
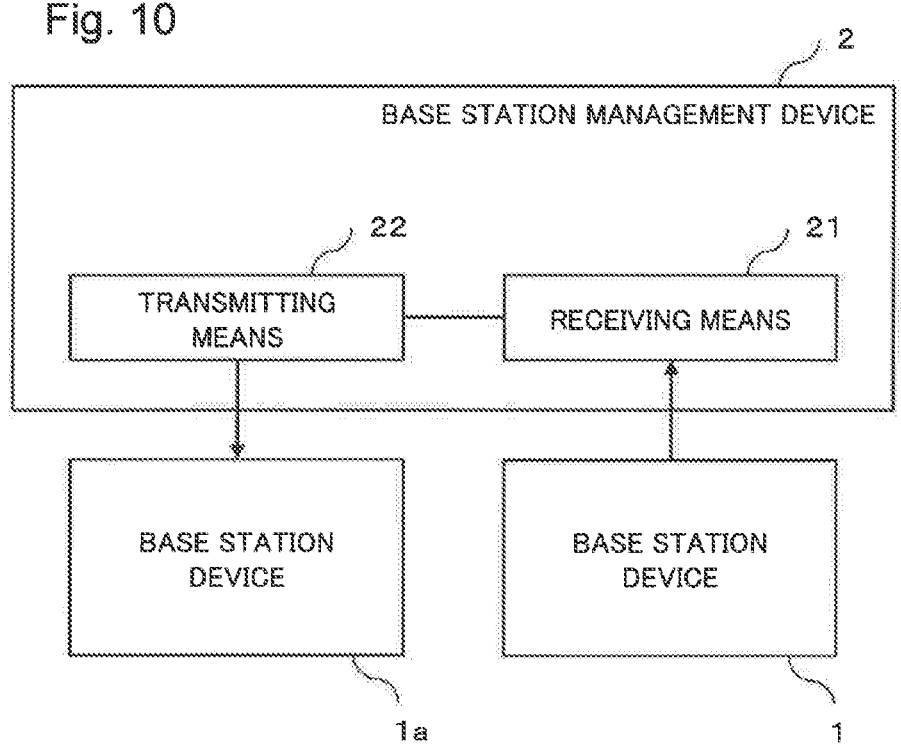
FIG. 10 is a block diagram illustrating a configuration of a base station management device according to a second example embodiment of the present invention.

FIG. 10 is a block diagram illustrating a configuration of a base station management device 2 according to a second example embodiment of the present invention. The base station management device 2 illustrated in FIG. 10 includes a receiving means 21 and a transmitting means 22. The receiving means 21 is a means for receiving, from a base station device 1, information indicating that a radio communication apparatus has been assigned to the base station device 1. The transmitting means 22 is a means for transmitting, to another base station device 1a present in a radio wave coverage area where communication with the base station device 1 is possible, information for switching a setting of the another base station device 1a to a restricted mode, based on the information received by the receiving means 21.

The receiving means 21 of the base station management device 2 may receive, from the base station device 1, not only the information (first information) but also third information, fourth information, and the like. The first information, the third information, the fourth information, and the like may be received by the receiving means 21 of the base station management device 2 from the base station device 1, by using a method such as Beacon. The transmitting means 22 of the base station management device 2 may transmit, to the another base station device 1a present in a radio wave coverage area where communication with the base station device 1 is possible, information for switching a setting of the another base station device 1a, based on the first information, the third information, the fourth information, and the like received by the receiving means 21. The base station management device 2 may store and/or update a setting and communication quality of the base station device 1, upon receiving the first information, the third information, the fourth information, and the like from the base station device 1. The base station management device 2 may transmit, to the base station device 1, information for causing the base station device 1 to transmit the first information, the third information, the fourth information, and the like to the base station management device 2.

Figure 11:
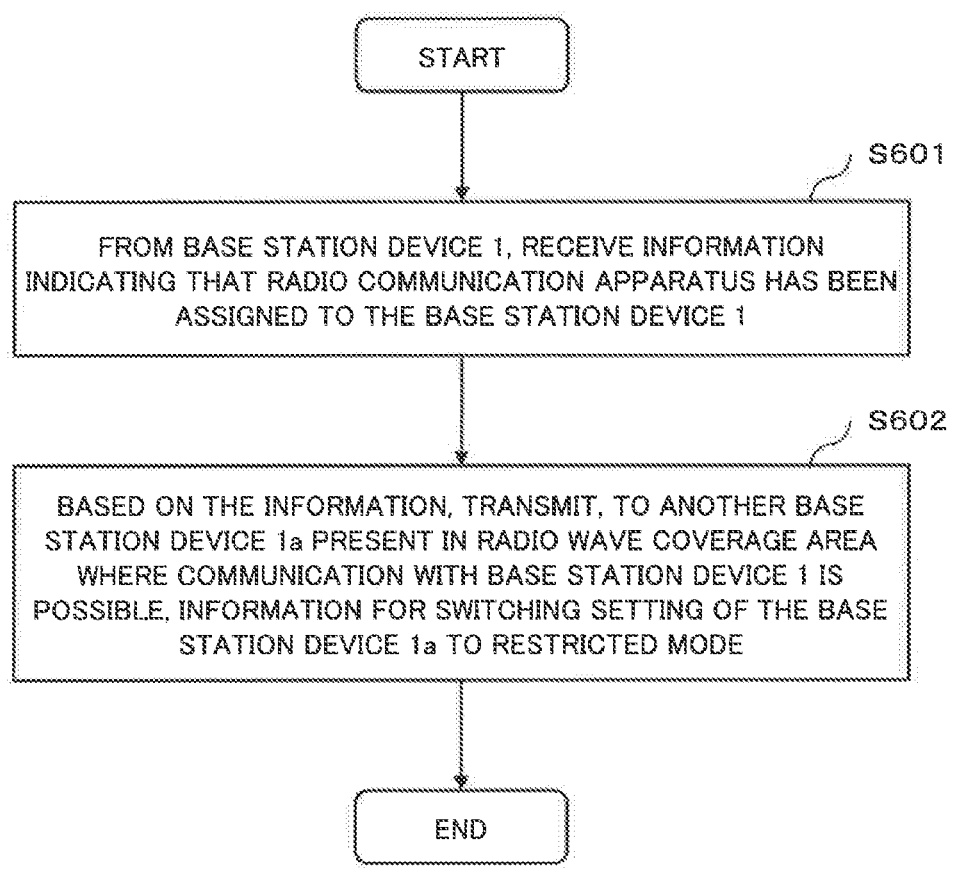
FIG. 11 is a diagram illustrating an operation of communication control of the base station management device according to the second example embodiment of the present invention.

FIG. 11 is a flowchart illustrating an operation of communication control of the base station management device 2 according to the second example embodiment of the present invention. According to FIG. 11, in Step S601, the base station management device 2 receives, from the base station device 1, information indicating that a radio communication apparatus has been assigned to the base station device 1. In Step S602, the base station management device 2 transmits, to the another base station device 1a present in a radio wave coverage area where communication with the base station device 1 is possible, information for switching a setting of the another base station device 1a to the restricted mode, based on the above-described information.

This operation of communication control is implemented by, for example, the base station management device 2. Specifically, Step S601 is implemented by, for example, the receiving means 21, and Step S602 is implemented by, for example, the transmitting means 22.

In the second example embodiment of the present invention, a radio communication apparatus newly attempting to communicate with a base station device is not assigned to a base station device switched to the restricted mode, but is rather assigned preferentially to another base station device, the another base station device being present in a radio wave coverage area where communication with the base station device is possible and being its setting other than the restricted mode, owing to the above-described characteristic. Consequently, the second example embodiment of the present invention enables to provide a base station management device and a communication control method that reduce influence of the exposed node problem and the deafness problem and enhance utilization efficiency of a communication resource, without modification of a radio communication apparatus such as a radio communication terminal.

The second example embodiment of the present invention enables to provide a base station management device and a communication control method that facilitate network design and management such as switching of the restricted mode.

Third Example Embodiment

Figure 12:
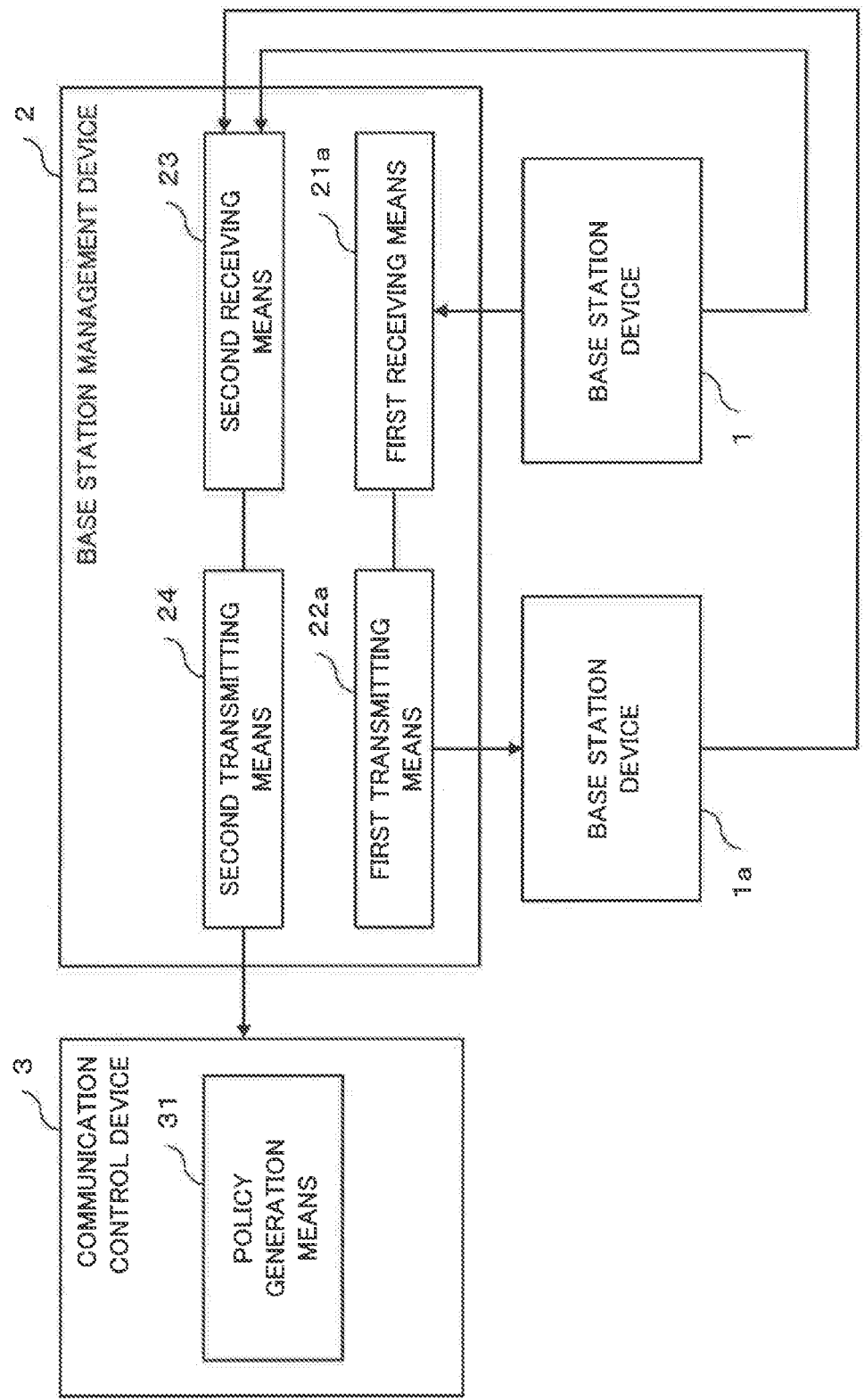
FIG. 12 is a block diagram illustrating a configuration of a communication control system according to a third example embodiment of the present invention.

FIG. 12 is a block diagram illustrating a configuration of a communication control system according to a third example embodiment of the present invention. The communication control system illustrated in FIG. 12 includes a base station device 1, a base station device 1a, a base station management device 2, and a communication control device 3. The base station device 1a is an example of another base station device present in a radio wave coverage area where communication with the base station device 1 is possible. The base station management device 2 includes a first receiving means 21a, a first transmitting means 22a, a second receiving means 23, and a second transmitting means 24. The first receiving means 21a is a means for receiving, from the base station device 1, first information indicating that a radio communication apparatus has been assigned to the base station device 1. The first transmitting means 22a is a means for transmitting, to the base station device 1a, information for switching a setting of the base station device 1a to a restricted mode, based on the first information. The second receiving means 23 is a means for receiving, from the base station devices 1 and 1a, fifth information indicating whether or not settings of the base station devices 1 and 1a are the restricted mode. The second transmitting means 24 is a means for transmitting the fifth information to the communication control device 3. The communication control device 3 includes a policy generation means 31. The policy generation means 31 is a means for generating, based on the fifth information, a connection policy for controlling connection of a radio communication apparatus to the base station device 1 and the base station device 1a. The communication control device 3 includes an access network discovery and selection function (ANDSF).

Figure 13:
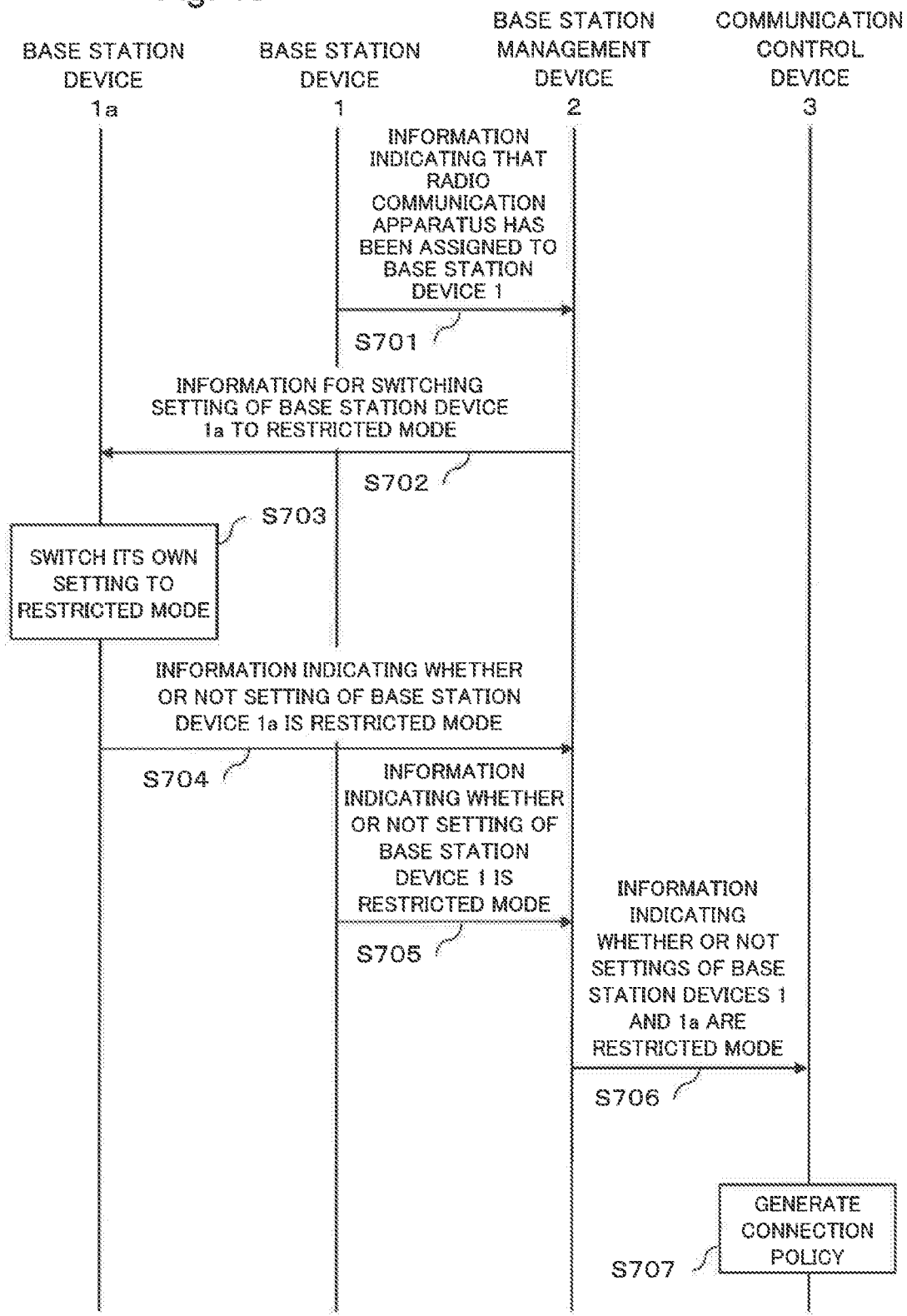
FIG. 13 is a sequence diagram illustrating an operation of the communication control system according to the third example embodiment of the present invention.

FIG. 13 is a sequence diagram illustrating an operation of the communication control system according to the third example embodiment of the present invention. According to FIG. 13, in Step S701, information indicating that a radio communication apparatus has been assigned to the base station device 1 is transmitted from the base station device 1 to the base station management device 2. In Step S702, information for switching a setting of the base station device 1a to the restricted mode is transmitted from the base station management device 2 to the base station device 1a. In Step S703, the base station device 1a switches its own setting to the restricted mode. In Step S704, information indicating whether or not a setting of the base station device 1a is the restricted mode is transmitted from the base station device 1a to the base station management device 2. In Step S705, information indicating whether or not a setting of the base station device 1 is the restricted mode is transmitted from the base station device 1 to the base station management device 2. In Step S706, information indicating whether or not settings of the base station device 1 and the base station device 1a are the restricted mode is transmitted from the base station management device 2 to the communication control device 3. In Step S707, the communication control device 3 generates a connection policy for controlling connection of a radio communication apparatus to the base station device 1 and the base station device 1a. The processing of Steps S704 and S705 may be executed in reverse order, or may be executed in parallel.

In the third example embodiment of the present invention, a connection destination of a radio communication apparatus newly attempting to communicate with a base station device is selected from the base station device 1a and the base station device 1, in accordance with a connection policy generated, by the communication control device 3, based on whether or not settings of the base station device 1a and the base station device 1 are the restricted mode, owing to the above-described characteristic. Consequently, the third example embodiment of the present invention enables to provide a communication control system that enables flexible control on connection of a radio communication apparatus to a base station device, connection of a radio communication apparatus to another access network and the like, and the like.

In the third example embodiment of the present invention, a communication control device including an access network discovery and selection function (ANDSF) generates a connection policy for controlling connection of a radio communication apparatus to a base station device, based on fifth information indicating whether or not a setting of a base station device is the restricted mode, owing to the above-described characteristic. Consequently, the third example embodiment of the present invention enables to provide a communication control system that enables flexible control on connection of a radio communication apparatus to a base station device, connection of a radio communication apparatus to another access network and the like, and the like.

Figure 14:
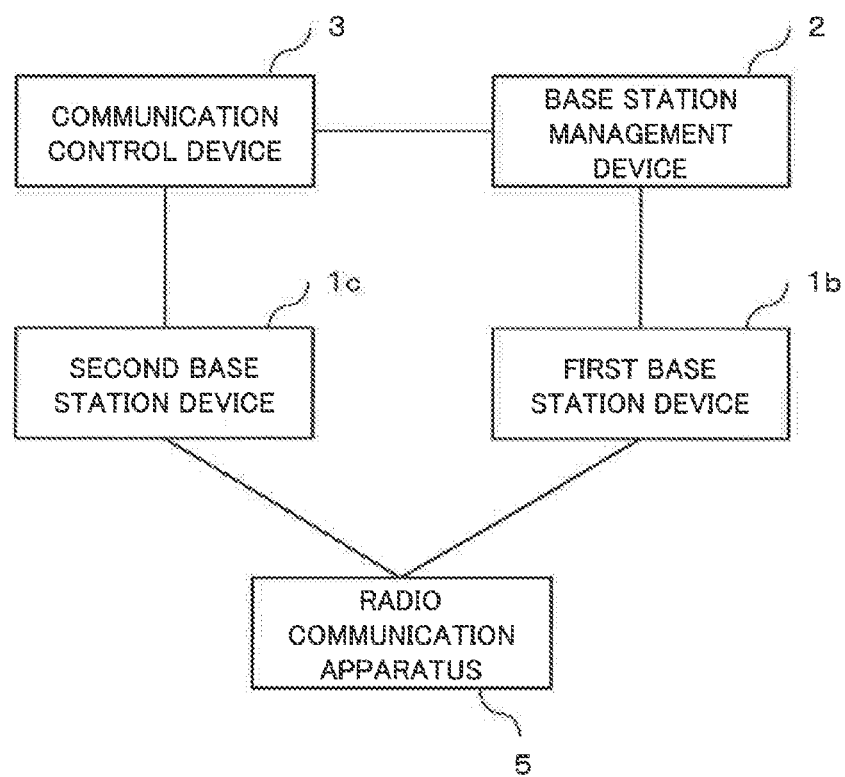
FIG. 14 is a block diagram illustrating a configuration of a communication control system according to a modification example 1 of the third example embodiment of the present invention.

FIG. 14 is a block diagram illustrating a configuration of a communication control system according to a modification example 1 of the third example embodiment of the present invention. The communication control system illustrated in FIG. 14 includes a radio communication apparatus 5, a first base station device 1b, a second base station device 1c, a base station management device 2, and a communication control device 3. The second base station device 1c forms an access network different from that of the first base station device 1b. For example, the first base station device 1b forms at least one of a wireless LAN and the like, and a radio access network (RAN) as an alternative thereto, whereas the second base station device 1c forms a mobile communication network, or at least one of a 3GPP network, and the like, and a RAN as an alternative thereto.

In FIG. 14, a connection relation among the radio communication apparatus 5, the first base station device 1b, the second base station device 1c, the base station management device 2, and the communication control device 3 is illustrated by a solid line. A communication medium among the radio communication apparatus 5, the first base station device 1b, the second base station device 1c, the base station management device 2, and the communication control device 3 may be of a wired or wireless medium.

Figure 15:
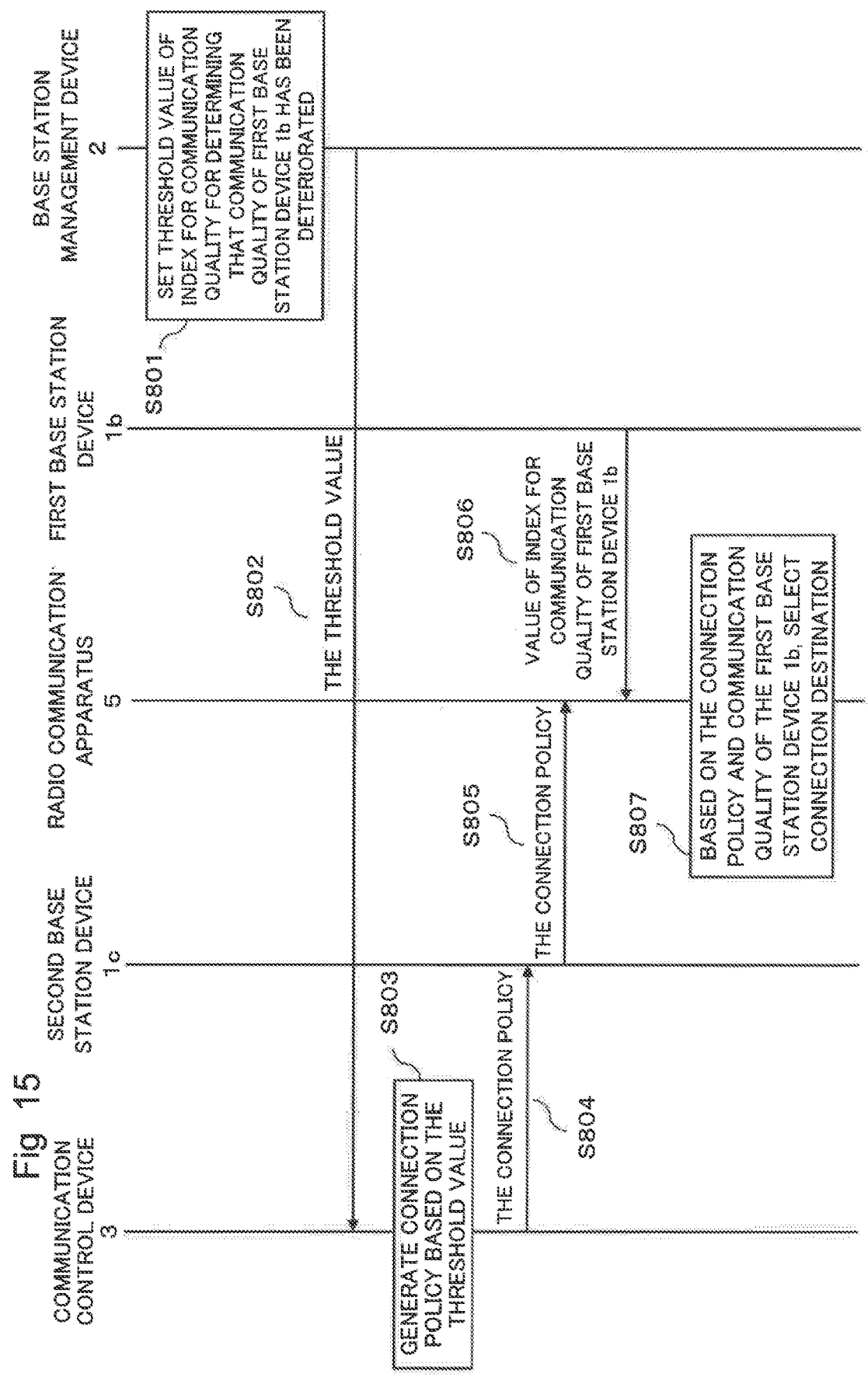
FIG. 15 is a sequence diagram illustrating an operation of the communication control system according to the modification example 1 of the third example embodiment of the present invention.

FIG. 15 is a sequence diagram illustrating an operation of the communication control system according to the modification example 1 of the third example embodiment of the present invention. According to FIG. 15, in Step S801, the base station management device 2 sets a threshold value of an index for communication quality (for example, throughput, delay time, jitter, a packet loss rate, a CPU use rate, a BSS load element (BLE), the number of assigned radio communication apparatuses, or the like) for determining that communication quality of the first base station device 1b has been deteriorated. In Step S802, the base station management device 2 transmits the above-described threshold value to the communication control device 3. In Step S803, the communication control device 3 generates a connection policy based on the above-described threshold value. In Step S804, the communication control device 3 transmits the above-described connection policy to the second base station device 1c. In Step S805, the second base station device 1c transmits the above-described connection policy to the radio communication apparatus 5. In Step S806, the first base station device 1b transmits, to the radio communication apparatus 5, its own value of an index for communication quality. In Step S807, the radio communication apparatus 5 selects a connection destination, based on the above-described connection policy and the value of the index for communication quality of the first base station device 1b. For example, when the above-described connection policy received by the radio communication apparatus 5 in S805 is a policy "When a value of an index for communication quality of the first base station device 1b exceeds a certain threshold value, be assigned to the second base station device 1c.", the radio communication apparatus 5 is assigned to the second base station device 1c when the value of the index for communication quality of the first base station device 1b received by the radio communication apparatus 5 in Step S806 exceeds the threshold value. Meanwhile, when the value of the index does not exceed the threshold value, the radio communication apparatus 5 stays assigned to the first base station device 1b. In Step S803, an additional policy may be generated that, for example, the radio communication apparatus 5 stays assigned to the first base station device 1b even when the value of the index exceeds the above-described threshold value depending on a user. In Step S806, transmission to the radio communication apparatus 5 may be performed by using, for example, Beacon. The processing of Step S806 may be executed periodically or non-periodically.

The access network discovery and selection function (ANDSF) is prescribed as a 3GPP-compliant technique. A device having the access network discovery and selection function (ANDSF) is included in a 3GPP network, and transmits, to a radio communication apparatus, a policy for determining to connect to either one of a 3GPP network and a wireless LAN. Examples of a wireless LAN selection policy (WLANSP) that is a policy prescribed in the access network discovery and selection function (ANDSF) include, as a parameter for selection, an SSID and the like as candidates. Selecting any one of a plurality of base station devices depends on a policy determined by a telecommunications carrier for each user. Thus, cooperation by a base station device being on a wireless LAN and a device having the access network discovery and selection function (ANDSF) becomes important.

In the modification example 1 of the third example embodiment of the present invention, selection of an access network to which the radio communication apparatus 5 is to be connected is controlled by cooperation of different access networks, owing to the above-described characteristic. Consequently, the modification example 1 of the third example embodiment of the present invention enables to provide such a communication control system that allows a radio communication apparatus to select an optimum access network.

The modification example 1 of the third example embodiment of the present invention enables to provide, particularly, such a communication control system that allows a radio communication apparatus to select an optimum access network when traffic is off-loaded from a 3GPP network to a wireless LAN.

Fourth Example Embodiment

Figure 16:
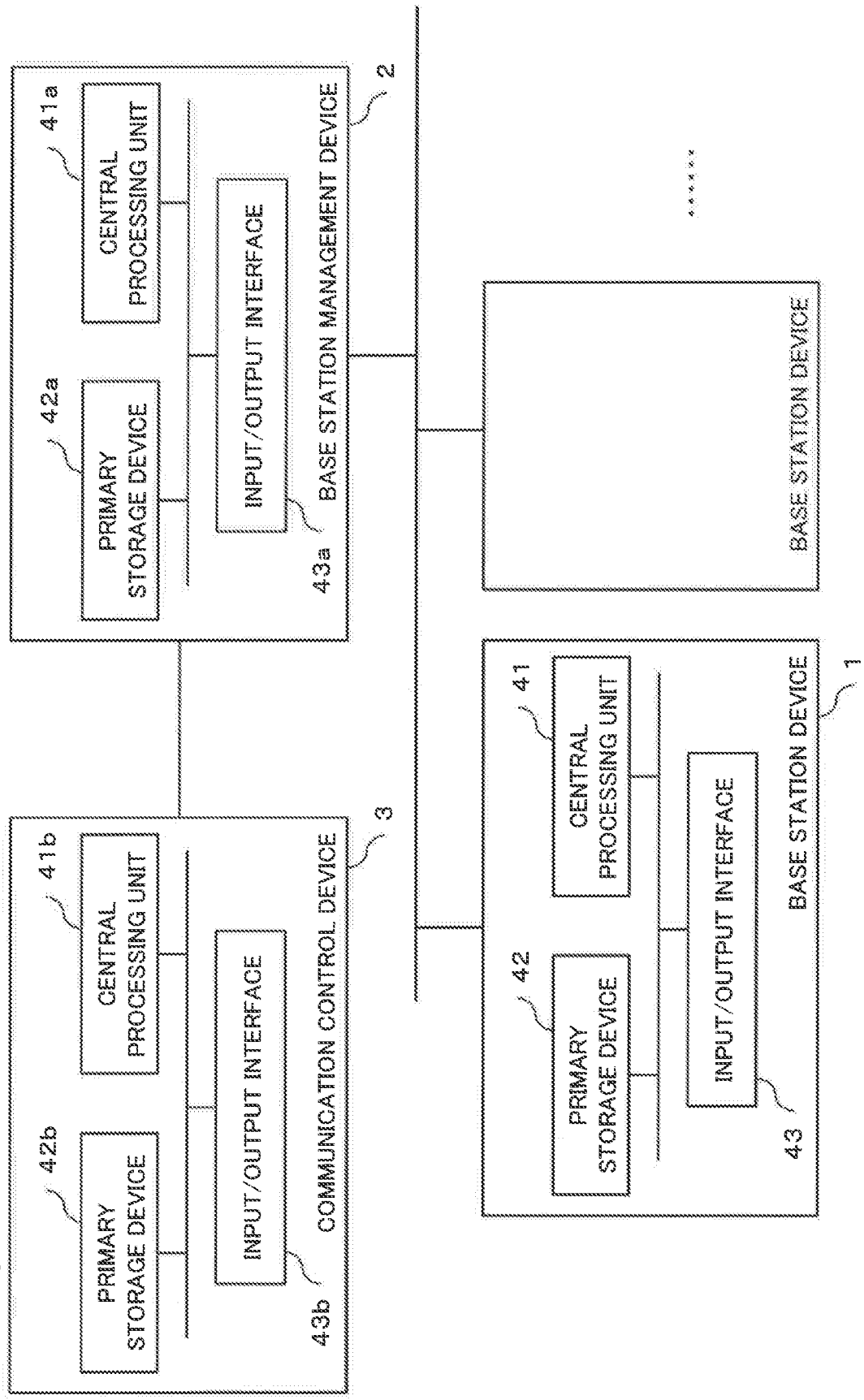
FIG. 16 is a block diagram illustrating a hardware configuration of a base station device, a base station management device, and a communication control device according to a fourth example embodiment of the present invention.

In a fourth example embodiment of the present invention illustrated in FIG. 16, a base station device 1 is constituted by hardware such as a central processing unit 41, a primary storage device 42, and an input/output interface 43. A receiving means 11 is implemented by, for example, the input/output interface 43. A control means 12 is implemented by, for example, the central processing unit 41 and the primary storage device 42.

As illustrated in FIG. 16, a base station management device 2 is constituted by hardware such as a central processing unit 41*a*, a primary storage device 42*a*, and an input/output interface 43*a*. A receiving means 21, a first receiving means 21*a*, a transmitting means 22, a first transmitting means 22*a*, a second receiving means 23, and a second transmitting means 24 are implemented by, for example, the input/output interface 43*a*.

As illustrated in FIG. 16, a communication control device 3 is constituted by hardware such as a central processing unit 41*b*, a primary storage device 42*b*, and an input/output interface 43*b*. A policy generation means 31 is implemented by, for example, the central processing unit 41*b* and the primary storage device 42*b*.

In FIG. 16, each of the base station device 1, the base station management device 2, and the communication control device 3 may be provided with an auxiliary storage device. In FIG. 16, a connection relation among the base station device 1, the base station management device 2, and the communication control device 3 is illustrated by solid lines. A communication medium among the base station device 1, the base station management device 2, and the communication control device 3 may be of a wired or wireless medium.

In the present disclosure, a radio communication apparatus and a base station device are described in a distinguished manner. However, these communication devices may form an ad hoc network, and these communication devices may be or may not be distinguished as to whether the communication device is a radio communication apparatus or a base station device.

The whole or part of the example embodiments disclosed above can be described as, but not limited to, the following supplementary notes.

(Supplementary Note 1)

A base station device comprising:

receiving means for receiving first information indicating that a radio communication apparatus has been assigned to another base station device present in a radio wave coverage area where communication with the base station device is possible; and control means for switching, based on the first information, a setting of the base station device to a restricted mode, wherein the restricted mode is a setting according to which the base station device receives, from at least one of the another base station device and a radio communication apparatus having issued a connection request, second information indicating that a response to the connection request issued by the radio communication apparatus has been issued by the another base station device, and performs, based on the second information, an operation for lowering a priority level for assignment to the base station device.

(Supplementary Note 2)

The base station device according to Supplementary Note 1, wherein the first information is information to be transmitted based on that a first radio communication apparatus has been assigned to the another base station device.

(Supplementary Note 3)

The base station device according to Supplementary Note 1 or 2, wherein the first information is information to be transmitted when a setting of the another base station device is not the restricted mode.

(Supplementary Note 4)

The base station device according to any one of Supplementary Notes 1 to 3, wherein the receiving means receives third information indicating that a radio communication apparatus has been unassigned from the another base station device, and the control means switches, based on the third information, the setting of the base station device from the restricted mode to a setting other than the restricted mode.

(Supplementary Note 5)

The base station device according to Supplementary Note 4, wherein, when the receiving means receives the third information from all of other base station devices having transmitted the first information, the control means switches the setting of the base station device from the restricted mode to a setting other than the restricted mode.

(Supplementary Note 6)

The base station device according to Supplementary Note 4 or 5, wherein the third information is information to be transmitted when the setting of the another base station device is not the restricted mode.

(Supplementary Note 7)

The base station device according to any one of Supplementary Notes 1 to 6, wherein, when the receiving means receives the first information for a first time after a first radio communication apparatus has been assigned to the base station device, the control means does not switch the setting of the base station device to the restricted mode.

(Supplementary Note 8)

The base station device according to any one of Supplementary Notes 1 to 7, wherein the first information is information to be transmitted based on that the restricted mode of the another base station device has been changed to a setting other than the restricted mode, when a radio communication apparatus is assigned to the another base station device being in the restricted mode.

(Supplementary Note 9)

The base station device according to any one of Supplementary Notes 1 to 8, wherein the receiving means receives fourth information indicating that communication quality of the another base station device has been deteriorated, and the control means switches, based on the fourth information, the setting of the base station device from the restricted mode to a setting other than the restricted mode.

(Supplementary Note 10)

The base station device according to Supplementary Note 9, wherein the fourth information is information to be transmitted when the setting of the another base station device is not the restricted mode.

(Supplementary Note 11)

The base station device according to any of Supplementary Notes 1 to 10, wherein at least one of the first information, third information indicating that a radio communication apparatus has been unassigned from the another base station device, and fourth information indicating that communication quality of the another base station device has been deteriorated is received from at least one of the another base station device and a base station management device, and the base station management device receives at least one of the first information, the third information, and the fourth information from the another base station device.

(Supplementary Note 12)

A communication control method comprising:

receiving information indicating that a radio communication apparatus has been assigned to another base station device present in a radio wave coverage area where communication with a base station device is possible; and switching, based on the information, a setting of the base station device to a restricted mode, wherein the restricted mode is a setting according to which the base station device receives, from at least one of the another base station device and a radio communication apparatus having issued a connection request, second information indicating that a response to the connection request issued by the radio communication apparatus has been issued by the another base station device, and performs, based on the second information, an operation for lowering a priority level for assignment of the radio communication apparatus to the base station device.

(Supplementary Note 13)

A base station management device comprising:

receiving means for receiving, from a base station device, information indicating that a radio communication apparatus has been assigned to the base station device; and transmitting means for transmitting, to another base station device present in a radio wave coverage area where communication with the base station device is possible, information for switching a setting of the another base station device to a restricted mode, based on the information, wherein the restricted mode is a setting according to which the base station device receives, from at least one of the another base station device and a radio communication apparatus having issued a connection request, second information indicating that a response to the connection request issued by the radio communication apparatus has been issued by the another base station device, and performs, based on the second information, an operation for lowering a priority level for assignment of the radio communication apparatus to the base station device.

(Supplementary Note 14)

A communication control method comprising:

receiving, from a base station device, information indicating that a radio communication apparatus has been assigned to the base station device; and transmitting, to another base station device present in a radio wave coverage area where communication with the base station device is possible, information for switching a setting of the another base station device to a restricted mode, based on the information, wherein the restricted mode is a setting according to which the base station device receives, from at least one of the another base station device and a radio communication apparatus having issued a connection request, second information indicating that a response to the connection request issued by the radio communication apparatus has been issued by the another base station device, and performs, based on the second information, an operation for lowering a priority level for assignment of the radio communication apparatus to the base station device.

(Supplementary Note 15)

A communication control system comprising:

a base station device;

a base station management device; and a communication control device including an access network discovery and selection function (ANDSF) of generating a connection policy for controlling connection of a radio communication apparatus to the base station device, wherein the base station management device includes:

first receiving means for receiving, from the base station device, first information indicating that a radio communication apparatus has been assigned to the base station device;

first transmitting means for transmitting, to another base station device present in a radio wave coverage area where communication with the base station device is possible, information for switching a setting of the another base station device to a restricted mode, based on the first information;

second receiving means for receiving, from the base station device, fifth information indicating whether or not a setting of the base station device is a restricted mode; and second transmitting means for transmitting the fifth information to the communication control device, the communication control device includes policy generation means for generating the connection policy, based on the fifth information, and the restricted mode is a setting according to which the base station device receives, from at least one of the another base station device and a radio communication apparatus having issued a connection request, second information indicating that a response to the connection request issued by the radio communication apparatus has been issued by the another base station device, and performs, based on the second information, an operation for lowering a priority level for assignment of the radio communication apparatus to the base station device.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2016-166376, filed on Aug. 29, 2016, the disclosure of which is incorporated herein in its entirety by reference.

REFERENCE SIGNS LIST

1 Base station device
1x Base station device
1y Base station device
1z Base station device
1a Base station device
1b First base station device
1c Second base station device
11 Receiving means
12 Control means
2 Base station management device
21 Receiving means
22 Transmitting means
21a First receiving means
22a First transmitting means
23 Second receiving means
24 Second transmitting means
3 Communication control device
31 Policy generation means
41 Central processing unit
42 Primary storage device
43 Input/output interface
41a Central processing unit
42a Primary storage device
43a Input/output interface
41b Central processing unit
42b Primary storage device
43b Input/output interface
5 Radio communication apparatus
5a Radio communication apparatus
5b Radio communication apparatus

What is claimed is:

1. A base station device comprising:
a receiving unit configured to receive first information indicating that a radio communication apparatus has been assigned to another base station device present in a radio wave coverage area where communication with the base station device is possible; and
a control unit configured to switch, based on the first information, a setting of the base station device to a restricted mode, wherein
the restricted mode is a setting according to which the base station device receives, from at least one of the another base station device and a radio communication apparatus having issued a connection request, second information indicating that a response to the connection request issued by the radio communication apparatus has been issued by the another base station device, and performs, based on the second information, an operation for lowering a priority level for assignment to the base station device.

2. The base station device according to claim 1, wherein the first information is information to be transmitted based on that a first radio communication apparatus has been assigned to the another base station device.

3. The base station device according to claim 1, wherein the first information is information to be transmitted when a setting of the another base station device is not the restricted mode.

4. The base station device according to claim 1, wherein
the receiving unit receives third information indicating that a radio communication apparatus has been unassigned from the another base station device, and
the control unit switches, based on the third information, the setting of the base station device from the restricted mode to a setting other than the restricted mode.

5. The base station device according to claim 4, wherein,
when the receiving unit receives the third information from all of other base station devices having transmitted the first information,
the control unit switches the setting of the base station device from the restricted mode to a setting other than the restricted mode.

6. The base station device according to claim 4, wherein
the third information is information to be transmitted when the setting of the another base station device is not the restricted mode.

7. The base station device according to claim 1, wherein,
when the receiving unit receives the first information for a first time after a first radio communication apparatus has been assigned to the base station device,
the control unit does not switch the setting of the base station device to the restricted mode.

8. The base station device according to claim 1, wherein
the first information is information to be transmitted based on that the restricted mode of the another base station device has been changed to a setting other than the restricted mode, when a radio communication apparatus is assigned to the another base station device being in the restricted mode.

9. The base station device according to claim 1, wherein
the receiving unit receives fourth information indicating that communication quality of the another base station device has been deteriorated, and
the control unit switches, based on the fourth information, the setting of the base station device from the restricted mode to a setting other than the restricted mode.

10. The base station device according to claim 9, wherein
the fourth information is information to be transmitted when the setting of the another base station device is not the restricted mode.

11. The base station device according to claim 1, wherein
at least one of the first information, third information indicating that a radio communication apparatus has been unassigned from the another base station device, and fourth information indicating that communication quality of the another base station device has been deteriorated is received from at least one of the another base station device and a base station management device, and
the base station management device receives at least one of the first information, the third information, and the fourth information from the another base station device.

12. A communication control method comprising:
receiving information indicating that a radio communication apparatus has been assigned to another base station device present in a radio wave coverage area where communication with a base station device is possible; and switching, based on the information, a setting of the base station device to a restricted mode, wherein the restricted mode is a setting according to which the base station device receives, from at least one of the another base station device and a radio communication apparatus having issued a connection request, second information indicating that a response to the connection request issued by the radio communication apparatus has been issued by the another base station device, and performs, based on the second information, an operation for lowering a priority level for assignment of the radio communication apparatus to the base station device.

13. A communication control system comprising:

a base station device;

a base station management device; and a communication control device including an access network discovery and selection function (ANDSF) of generating a connection policy for controlling connection of a radio communication apparatus to the base station device, wherein the base station management device includes:

a first receiving unit configured to receive, from the base station device, first information indicating that a radio communication apparatus has been assigned to the base station device;

a first transmitting unit configured to transmit, to another base station device present in a radio wave coverage area where communication with the base station device is possible, information for switching a setting of the another base station device to a restricted mode, based on the first information;

a second receiving unit configured to receive, from the base station device, fifth information indicating whether or not a setting of the base station device is a restricted mode; and a second transmitting unit configured to transmit the fifth information to the communication control device, the communication control device includes a policy generation unit configured to generate the connection policy, based on the fifth information, and the restricted mode is a setting according to which the base station device receives, from at least one of the another base station device and a radio communication apparatus having issued a connection request, second information indicating that a response to the connection request issued by the radio communication apparatus has been issued by the another base station device, and performs, based on the second information, an operation for lowering a priority level for assignment of the radio communication apparatus to the base station device.

* * * * *